United States Patent
Kuriyama et al.

(10) Patent No.: US 6,571,829 B2
(45) Date of Patent: Jun. 3, 2003

(54) GAS CONTROL VALVE IN WATER HEATER

(75) Inventors: Tatsuo Kuriyama, Nagoya (JP); Atsushi Tanahashi, Nagoya (JP)

(73) Assignee: Paloma Industries Limited, Aichi (JP)

(*) Notice: Subject to any disclaimer, the term of this patent is extended or adjusted under 35 U.S.C. 154(b) by 41 days.

(21) Appl. No.: 09/808,871

(22) Filed: Mar. 15, 2001

(65) Prior Publication Data

US 2001/0022198 A1 Sep. 20, 2001

(30) Foreign Application Priority Data

Mar. 16, 2000 (JP) .................................... 2000-073749

(51) Int. Cl.$^7$ .............................. F16K 11/14; F23N 5/26
(52) U.S. Cl. ................ 137/630.2; 137/66; 137/630.19; 251/251; 236/20 R; 431/60; 431/281
(58) Field of Search .................... 137/66, 630.19, 137/630.2; 251/251; 236/20 R, 24; 431/50–54, 60, 72, 77, 280, 281

(56) References Cited

U.S. PATENT DOCUMENTS

| | | | |
|---|---|---|---|
| 1,983,822 A | * 12/1934 | Spencer | 137/65 |
| 2,918,088 A | * 12/1959 | Garner | 137/630.19 |
| 3,159,346 A | * 12/1964 | Caparone et al. | 137/630.19 |
| 3,915,378 A | * 10/1975 | Kinsella et al. | 236/15 A |
| 4,007,872 A | * 2/1977 | Branson et al. | 236/15 A |
| 4,076,487 A | * 2/1978 | Stoneking | 431/25 |
| 4,191,214 A | * 3/1980 | Holley et al. | 137/630.2 |
| 4,422,844 A | 12/1983 | Graham et al. | 431/72 |
| 4,640,676 A | 2/1987 | Katchka et al. | 431/54 |
| 4,729,396 A | * 3/1988 | Kelly et al. | 137/630.19 |
| 4,975,043 A | 12/1990 | Katchka et al. | 431/54 |
| 5,312,036 A | * 5/1994 | Trotter | 236/21 B |
| 5,326,029 A | 7/1994 | Schultz | 236/68 D |
| 5,407,128 A | 4/1995 | Schultz | 236/68 D |
| 5,484,103 A | 1/1996 | Schultz | 236/68 D |

* cited by examiner

Primary Examiner—Michael Powell Buiz
Assistant Examiner—Ramesh Krishnamurthy
(74) Attorney, Agent, or Firm—Pearson & Pearson, LLP

(57) ABSTRACT

A gas control valve in a water heater is provided for improving the ease of assembling, minimizing the size and the cost, and decreasing the limitation of layout design.

For example, in a flame-retention, storage type closed vessel gas water heater for automatically controlling the temperature of hot water in a tank to a predetermined temperature, a cam member 3 having a pilot cam surface 3b, a main cam surface 3a, and an extinction cam surface 3c thereof arranged along one track is fixedly mounted on an ignition operating shaft 2 equipped with an ignition knob 1 for turning together and also arranged for direct engagement with the proximal end 13a of the valve pin 13 which has a pilot valve V1 fixedly mounted on the distal end thereof, a main valve V slidably mounted thereon below the pilot valve V1, and a main valve opening collar plate 14 fixedly mounted thereon below the main valve V as spaced by a given distance "a" from the same so that the valve pin 13 can be shifted forward and backward by a predetermined sequence of actions of the cam member 3 to open and close the pilot valve V1 and the main valve V aligned along the axis of the valve pin 13 in response to the movement of the ignition knob 1 for controlling the supply of fuel gas to turn on and off the combustion of the water heater.

2 Claims, 4 Drawing Sheets

GAS CONTROL VALVE IN WATER HEATER

BACKGROUND OF THE INVENTION

1. Field of the Invention

The present invention relates to a gas control valve in a water heater.

2. Description of the Related Art

Generally, a storage type closed vessel gas water heater of a flame-retention for automatically controlling the temperature of hot water in a tank to a predetermined level has a gas control valve consisting mainly of a main valve V and a pilot valve V1 arranged along two parallel axes (See FIG. 8).

However, the main valve V and the pilot valve V1 of such a conventional gas control valve are arranged along two parallel axes and their layout may be limited in design. Also, the valves V and V1 along the two axes are actuated with a couple of corresponding cam members 3 and 3' of a main cam 3a and a pilot cam 3b respectively. This may increase the number of the components and require more labor for assembly. Moreover, the gas control valve itself will be increased in the size and the cost.

SUMMARY OF THE INVENTION

It is thus an object of the present invention to provide a gas control valve in a water heater which has a pilot valve and a main valve arranged along a single axis thus to eliminate the foregoing drawbacks.

For achievement of the above object, a gas control valve in a water heater defined in claim 1 of the present invention comprises a pilot valve and a main valve aligned along one axis and arranged operable with an ignition knob for opening and closing, wherein the pilot valve and the main valve are opened in this order and closed in reverse order.

Also, a gas control valve in a water heater defined in claim 2 is a modification of the gas control valve according to claim 1, which further comprises: a cam member mounted on an operating shaft provided with the ignition knob and having a pilot cam surface, a main cam surface, and an extinction cam surface thereof aligned in one track; and a valve pin having the pilot valve fixedly mounted on the distal end thereof, the main valve slidably mounted thereon below the pilot valve, and a main valve opening collar plate fixedly mounted thereon below the main valve as spaced by a given distance from the main valve, and arranged for engagement at the proximal end with the cam member, wherein the valve pin is moved forward and backward by the action of the cam member determined by a program so that the pilot valve and the main valve aligned along the axis of the valve pin can be opened in this order and closed in reverse order in response to the movement of the ignition knob for turning on and off the combusting action.

Since the gas control valve in the water heater according to claim 1 of the present invention has the pilot valve and the main valve aligned along single axis for being opened and closed in response to the operation of the ignition knob, its components can be minimized in the number and the pilot valve and the main valve can be assembled in a unit. Accordingly, while its assembling procedure is improved, the gas control valve will be minimized in the overall size and the cost. Moreover, its layout unlike any conventional two-axe arrangement will be less limitative.

The opening action of the pilot valve always precedes the opening action of the main valve. Also, the closing action of the pilot valve is always preceded by the closing action of the main valve. This allows the water heater to be controlled safely and precisely for supply of fuel gas to turn on and off the combustion.

According to the gas control valve in a water heater defined in claim 2 of the present invention, the cam member having the pilot cam surface, the main cam surface, and the extinction cam surface thereof arranged along one track is fixedly mounted on the ignition operating shaft equipped at the proximal end with the ignition knob and also arranged for direct engagement with the proximal end of the valve pin which has the pilot valve fixedly mounted on the distal end thereof, the main valve slidably mounted thereon below (on the left as shown in FIG. 1) the pilot valve, and the main valve opening collar plate fixedly mounted thereon below (on the left as shown in FIG. 1) the main valve as spaced by a given distance from the main valve so that the valve pin can be moved forward and backward by a predetermined sequence of actions of the cam member to open and close the pilot valve and the main valve aligned along the axis of the valve pin. More particularly, the pilot valve and the main valve are opened in this order and closed in reverse order for turning on and off the combustion. As the ignition knob is turned, the cam member turns and its cam surfaces drive the valve pin to move forward and backward according to a predetermined program thus to open and close the pilot valve and the main valve for controlling the supply of fuel gas to turn on and off the combustion. Accordingly, the gas control valve defined in claim 1 of the present invention will be implemented without difficulty.

DETAILED DESCRIPTION OF THE PREFERRED EMBODIMENT

Figure 1:
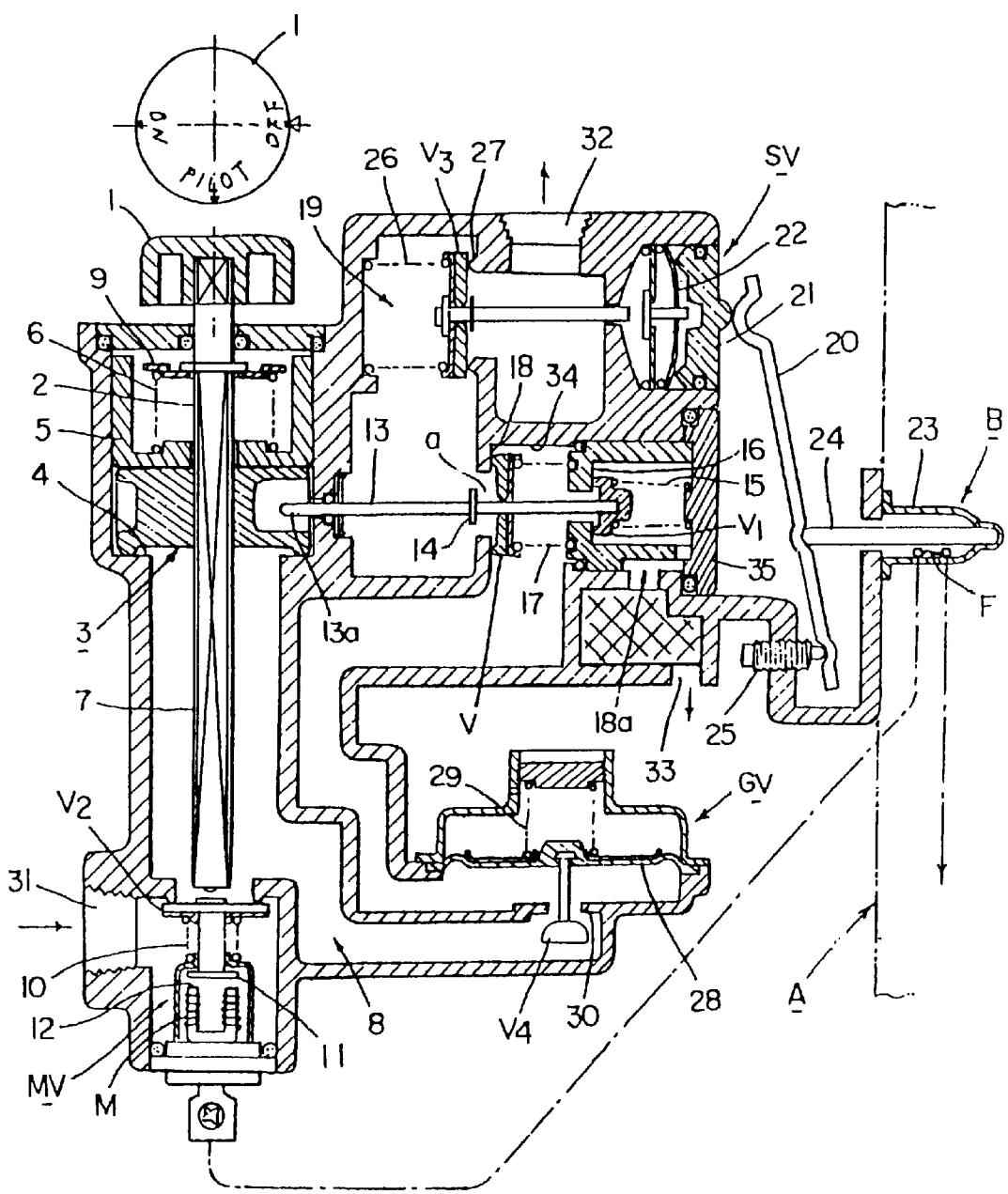
FIG. 1 is a schematic cut-out cross sectional view of a gas control valve in a water heater according to the present invention.
Figure 2:
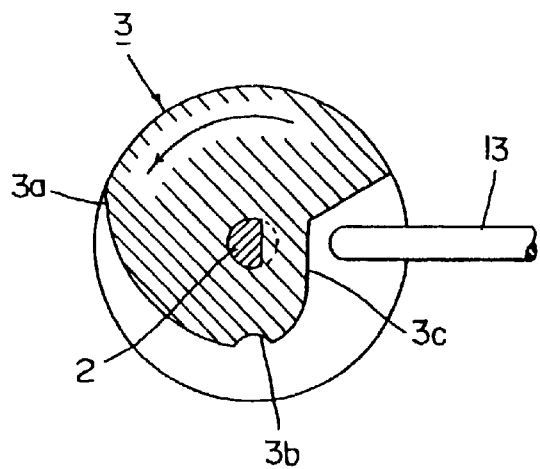
FIG. 2 is a cross sectional view showing the positional relationship between a cam member and a valve pin for turning off the combustion.
Figure 3:
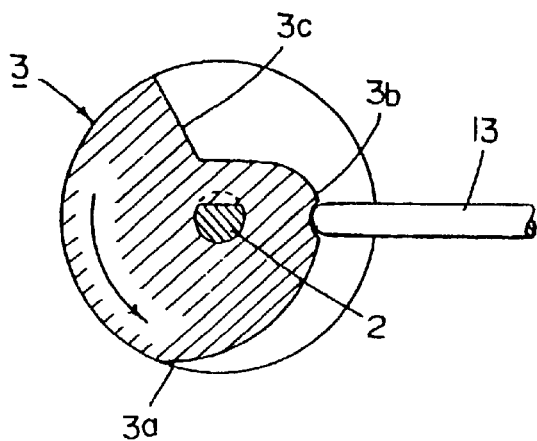
FIG. 3 is a cross sectional view showing the positional relationship between the cam member and the valve pin for igniting gas from the pilot valve.
Figure 4:
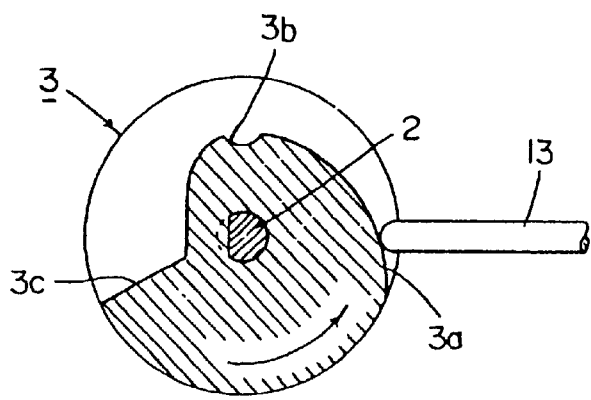
FIG. 4 is a cross sectional view showing the positional relationship between the cam member and the valve pin for igniting gas from the main valve.
Figure 5:
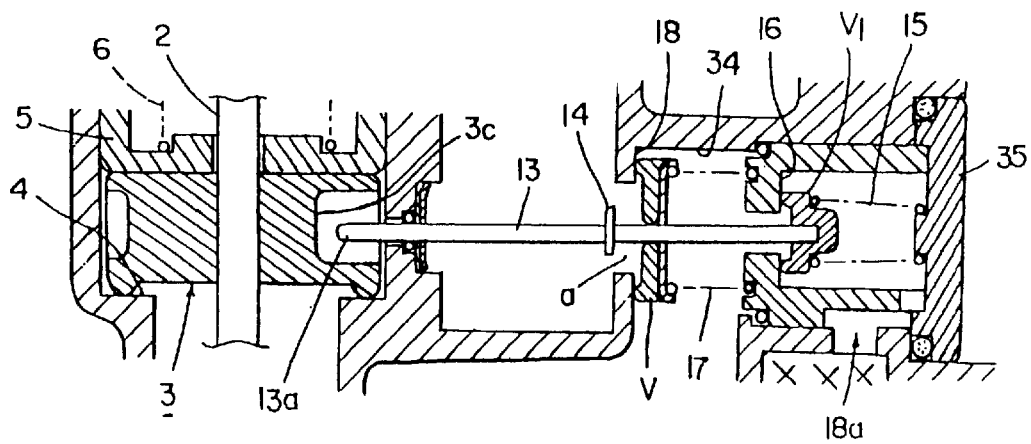
FIG. 5 is a cross sectional view showing a primary part of the gas control valve for extinction.
Figure 6:
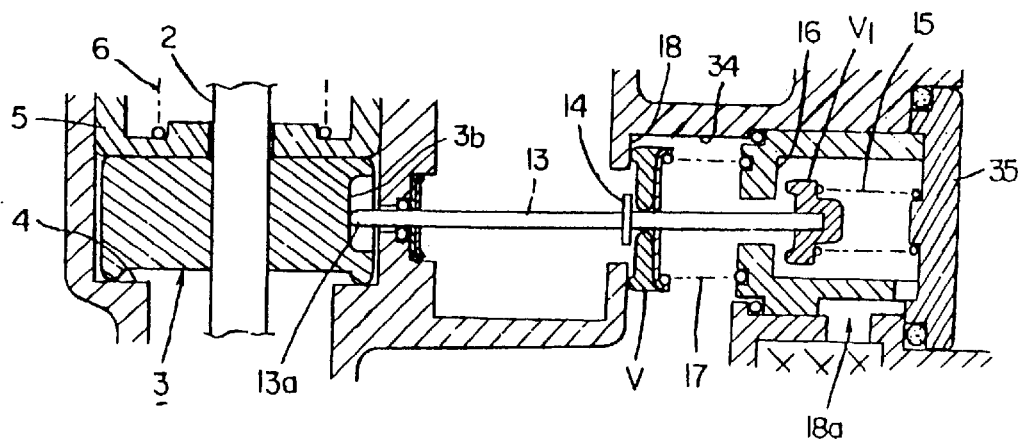
FIG. 6 is a cross sectional view showing the primary part of the gas control valve for igniting gas from the pilot valve.
Figure 7:
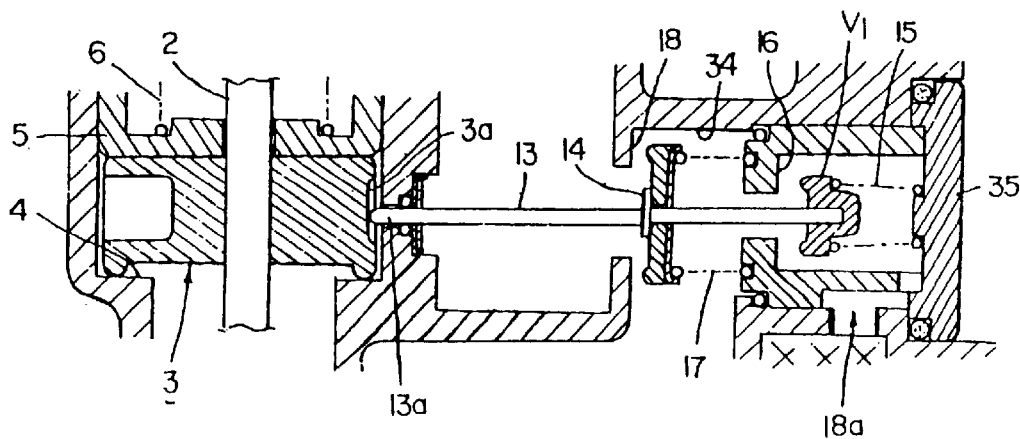
FIG. 7 is a cross sectional view showing the primary part of the gas control valve for igniting gas from the main valve.
Figure 8:
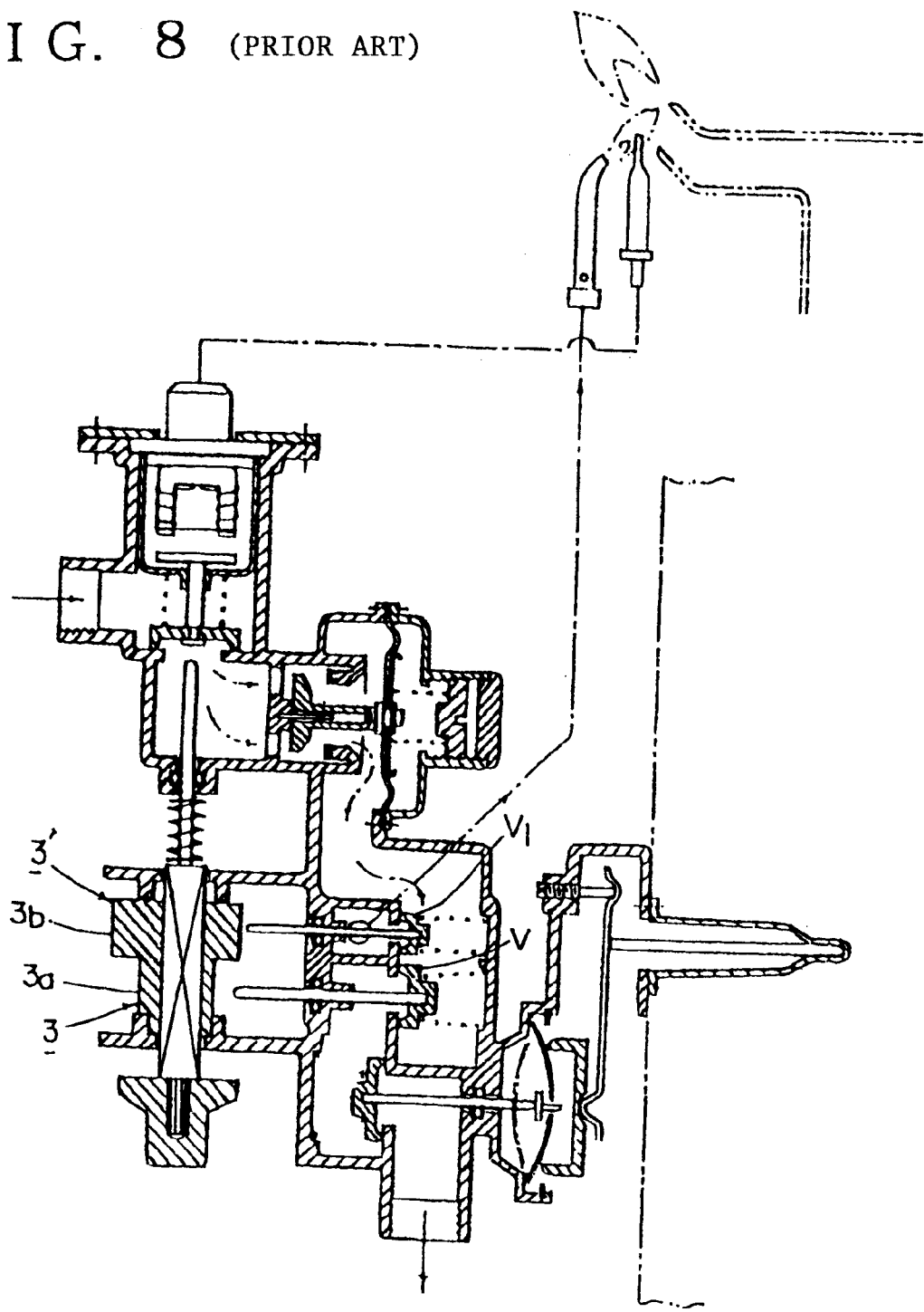
FIG. 8 is a schematic cut-off cross sectional view of a conventional valve where two axes are provided in parallel to each other.

For clarifying the previously described arrangement and action of the present invention, a preferred embodiment of the gas control valve in a water heater according to the present invention will be described in more detail referring to the relevant drawings.

The preferred embodiment of the present invention is illustrated in the form of a gas control valve in a flame-retention, storage type closed vessel gas water heater for automatically controlling the temperature of hot water in a tank to a predetermined level. As shown, an ignition knob 1 is turned and pressed down for opening a pilot valve V1, a magnetic valve V2, and a main valve V in this order. More specifically, the ignition knob 1 is mounted to the proximal end of an ignition operating shaft 2 which has a cam member 3 mounted thereon as fixed to allow to be moved only in the rotating direction. The cam member 3 has a main cam surface 3a, a pilot cam surface 3b, and an extinction cam surface 3c thereof aligned along one track and is disposed between a support step 4 and a pressing member 5. The ignition operating shaft 2 is integrally joined to a shaft extension 7 which coaxially extends to a solenoid safety valve unit MV disposed across an upstream portion of a gas flow passage 8. Also shown are a return spring 6 for the ignition knob 1 and a cam plate 9 fixedly mounted on the ignition operating shaft 2 for supporting one end of the spring 6 as well as pressing the magnetic valve V2 only when the ignition knob 1 is at its pilot valve V1 opening position.

The solenoid safety valve unit MV comprises the magnetic valve V2 pressed towards the closing direction by a spring 10 and an attraction plate 11 integrated to the magnetic valve V2 and arranged to face a magnetically attracting surface 12 of an electromagnet M to move to and from it. The shaft extension 7 of the ignition operating shaft 2 is coaxially aligned for movement to and from the magnetic valve V2 of the solenoid safety valve unit MV. The ignition operating shaft 2 having the shaft extension 7 remains pressed by the spring 6 towards the retracting direction.

Devoted by 13 is a valve pin, and the pilot valve V1 is mounted to the distal end of the valve pin 13. The main valve V is slidably mounted to the valve pin 13 below (on the left in FIG. 1) the pilot valve V1. Also, a collar plate 14 to press and move the main valve V in opening direction is fixedly mounted on the valve pin 13 as spaced downwardly (towards the left in FIG. 1) by a distance "a" from the main valve V. The proximal end 13a of the valve pin 13 extends crosswisely for engagement with the cam surfaces 3a, 3b, and 3c of the cam member 3.

The pilot valve V1 is pressed in the closing direction by a spring 15 and arranged for movement to and from a valve seat 16. The main valve V is pressed in the closing direction by a spring 17 and arranged for movement to and from a valve seat 18. The distance of play "a" between the main valve V and the collar plate 14 is provided for allowing the opening action of the pilot valve V1 to precede the opening action of the main valve V coaxially located for ignition.

The pilot vale V1, the main valve V, the pilot valve seat 16 of the pilot valve V1, and a cap 35 have been mounted to the valve pin 13 to form a unit body, then their assembly as a unit is installed in a valve chamber 34 for attachment. As a result, the main valve V and the pilot valve V1 on an axis can precisely be positioned on the valve pin 13.

The procedure of igniting and extinguishing on the above arrangement will now be described. The procedure starts with turning the ignition knob 1 counter-clockwise (to the left) through substantially 90 degrees from the extinction position (OFF) to the pilot position (PILOT) shown in FIG. 1. This causes the cam member 3 fixed on the ignition operating shaft 2 to turn substantially 90 degrees in the same direction so that its extinction cam surface 3c is replaced by the pilot cam surface 3b. Accordingly, the pilot cam surface 3b drives the valve pin 13 by one stroke to the right shown in FIG. 1 and allows the pilot valve V1 to depart from the valve seat 16 as resisting against the pressing force of the spring 15. While the pilot valve V1 is open, the main valve V remains closed (See FIGS. 2 and 3 and FIGS. 5 and 6).

Then, the ignition knob 1 is depressed by one stroke along the axial direction (downwardly in FIG. 1) as resisting against the pressing force of the spring 6. Accordingly, the magnetic valve V2 disposed across the axis of the shaft extension 7 of the ignition operating shaft 2 is opened by the shaft extension 7 and the attraction plate 11 joined integral with the magnetic valve V2 is in direct contact with the magnetic attracting surface 12 of the electromagnet M. As the magnetic valve V2 is opened, the passage of fuel gas is communicated with a pilot burner (not shown). When the pilot burner is filled with gas, it can manually be ignited using a lighter, a match, or the like. The pilot burner when ignited heats up a thermocouple (not shown) which in turn generates electromotive force for maintaining the opening of the magnetic valve V2.

When the ignition knob 1 is released from depression, the ignition operating shaft 2 integrated with the ignition knob 1 remaining at the pilot position is returned back to its original position by the pressing force of the spring 6. The ignition knob 1 may be depressed for a few seconds. The ignition knob 1 is further turned from the pilot position (PILOT) to the main position (ON) counter-clockwisely through substantially 90 degrees, as shown in FIG. 1. This causes the cam member 3 to turn substantially 90 degrees in the same direction so that the pilot cam surface 3b is replaced by the main cam surface 3a. The main cam surface 3a drives the valve pin 13 further by a specific stroke to the right shown in FIG. 1 and the collar plate 14 presses the main valve V for separation from the valve seat 18 as resisting against the pressing force of the spring 17 (See FIGS. 3 and 4 and FIGS. 6 and 7). As the main valve V is opened, the main passage of fuel gas 19 is communicated with a main burner (not shown) via a snap valve V3 described later. Accordingly, the main burner is filled with gas and ready for ignition with pilot flame. This is followed by a sensor bar B detecting the temperature of hot water in a tank A and automatically controlling the opening and closing action of a snap valve unit SV to ignite and extinguish the flame of the main burner for maintaining the temperature of the hot water to a desired level, as will be described later in more detail.

The snap valve unit SV is responsive to the temperature of the hot water in the tank A for automatically controlling the temperature of the hot water by opening and closing the passage of fuel gas 19 to the main burner. More specifically, as the sensor bar B installed in the tank A expands and contracts lengthwisely corresponding to the temperature of the hot water in the tank A, a snap lever 20 presses or depresses the snap plate 22 via a pressing member 21 to open or close the snap valve V3.

The sensor bar B may consist of an amber material 24 which is low in the linear expansion rate and accommodated in a copper case 23 which is high in the linear expansion rate. As the copper case 23 is expanded or contracted corresponding to the temperature of the hot water in the tank A, the amber material 24 moves forward or backward. The snap plate 22 is made of a reverse sheet spring which has a cup-like shape and is arranged for automatically returning in one direction (for closing the snap valve V3). The snap plate 22 is pressed at its edge by the pressing member 21. Also, shown is a temperature adjusting screw 25 for acting as the fulcrum supporting the proximal end of the snap lever 20. With the temperature adjusting screw 25 determining the pressing force of the snap plate 22 against the pressing member 21 in relation to the movement of the amber material 24, the opening and closing action of the snap valve V3 can be controlled in the duration to maintain the temperature of the hot water to a desired level.

When the temperature of the hot water in the tank A drops down from the desired level, the sensor bar B responds to the temperature drop and the copper case 23 contracts. This causes the amber material 24 to move forward (to the left in FIG. 1) thus pressing and turning the snap lever 20 about its fulcrum or the temperature adjusting screw 25 to the left in FIG. 1. As the distal end of the snap lever 20 pushes the pressing member 21, the snap plate 22 is moved opposite to its pressing direction to the left in FIG. 1 and reversed. Accordingly, the snap valve V3 is shifted to the left in FIG. 1 by the reversing force of the snap plate 22 as resisting against the pressing force of the spring 26, hence departing from the valve seat 27. As a result, the main gas passage 19 to the main burner is opened up for supplying the main burner with gas. When the main burner is ignited with pilot flame, it may heat up a natural convection type heat collector (not shown) to elevate the temperature of the hot water in the tank A.

Upon the temperature of the hot water in the tank A rising to a desired level by the combustion of the main burner, the sensor bar B responds to the temperature increase and its copper case 23 expands lengthwisely. This causes the amber material 24 to move backward (to the right in FIG. 1) thus releasing the pressing action of the snap lever 20 against the snap plate 22. As the snap plate 22 returns back to its original position, the snap valve V3 is pressed and closed by the pressing force of the spring 26 to the right in FIG. 1. Accordingly, the main gas passage 19 to the main burner is shut up with the snap valve V3 hence turning off the main burner.

In this manner, the temperature of the hot water in the tank A can constantly be maintained to a desired or setting level. Also shown is a thermal fuse F which is installed in the copper case 23 of the sensor bar B and connected to a magnetic circuit. When the temperature of the hot water in the tank A exceeds the setting level, blowing the fuse F disconnects the circuit and shuts up the magnetic valve V2 for canceling the supply of fuel gas for safety.

When the ignition knob 1 has been turned from the extinction position to the pilot position, pressed down for igniting pilot flame, released from the pressing, and turned from the pilot position to the main position for remaining in the stand-by state, the snap valve unit SV is controlled by the movement of the sensor bar B responsive to changes in the temperature of the hot water in the tank A for automatically opening and closing the main gas passage 19 to the main burner thus to turn on and off the combusting action of the main burner, whereby the temperature of the hot water in the tank A can constantly be maintained to a desired level.

For turning off the main burner, the ignition knob 1 is turned from the main position (ON) to the extinction position (OFF) clockwisely (to the right) in FIG. 1 through substantially 180 degrees. This causes the cam member 3 fixed to the ignition operating shaft 2 to turn in the same direction through substantially 180 degrees so that its main cam surface 3a is replaced via the pilot cam surface 3b by the extinction cam surface 3c. Accordingly, the valve pin 13 is moved a specific stroke to the left in FIG. 1, permitting the main valve V and the pilot valve V1 on the same axis to come in direct contact with their respective valve seats 18 and 15 in this order thus to shut up the main gas passage 19 and then the pilot gas passage 18a. As heating the thermocouple by the pilot flame is stopped, its electromotive force disappears and the magnetic valve V2 is closed hence ceasing the combusting action.

As described, the embodiment of the present invention allows the magnetic valve V2 to be closed by extinguishing the flame-retention type pilot burner and can avoid declination of the electromotive force deriving from an increase with time in the resistance in the magnetic circuit, unlike a conventional arrangement where the contact in the magnetic circuit is opened for turning off.

Denoted by GV is a gas governor for allowing the secondary gas pressure to press a diaphragm 28 and thus the diaphragm 28 and a gas valve V4 to move until the action is balanced with the pressing force of a pressure adjusting spring 29 to control the opening of a gas passage 8 between the gas valve V4 and the valve seat 30. Accordingly, even if the pressure of fuel gas supplied varies more or less at the upstream, the amount of gas in use can be maintained constant at the downstream to stabilize the gas pressure. Also, shown are a gas inlet 31, a main gas outlet 32, and a pilot gas outlet 33.

One example of the embodiment according to the invention is described above, but; it would be understood that the present invention is not limited to the embodiment which is only illustrative but various changes and modifications may be made without departing from the scope of the present invention.

Since the gas control valve in the water heater according to the present invention has the pilot valve and the main valve arranged along one signal axis for being opened and closed with the movement of the single cam which is controlled by the operation of the ignition knob, its components can be minimized in the number and the pilot valve and the main valve can be assembled in a unit. Accordingly, while its assembling procedure is improved, the gas control valve will minimize the overall size and the cost. Moreover, its layout unlike any conventional two-axe arrangement will be less limitative.

The opening action of the pilot valve always precedes the opening action of the main valve. Also, the closing action of the pilot valve is always preceded by the closing action of the main valve. This allows the water heater to be controlled safely and precisely for supply of fuel gas to turn on and off the combustion. In particular, the present invention is most favorable for use in a storage type closed vessel gas water heater which can automatically control the temperature of hot water in its tank to a desired level.

What is claimed is:

1. A gas control valve in a water heater comprising a pilot valve and a main valve aligned along one axis and arranged operable with an ignition knob for opening and closing the pilot valve and the main valve, wherein the pilot valve and the main valve are opened in this order and closed in reverse order.

2. A gas control valve in a water heater according to claim 1, further comprising:

a cam member mounted on an operating shaft provided with the ignition knob and having a pilot cam surface, a main cam surface, and an extinction cam surface thereof aligned in one track; and a valve pin having the pilot valve fixedly mounted on the distal end thereof, the main valve slidably mounted thereon below the pilot valve, and a main valve opening collar plate fixedly mounted thereon below the main valve as spaced by a given distance from the main valve, and arranged for engagement at the proximal end with the cam member, wherein the valve pin is moved forward and backward by the action of the cam member determined by a program so that the pilot valve and the main valve, aligned along the axis of the valve pin, can be opened in this order and closed in reverse order in response to the movement of the ignition knob for turning on and off a combusting action.

* * * * *